April 9, 1929. G. E. EDMUNDS 1,708,608
WHEEL MOUNTING FOR MINE CARS
Filed Feb. 4, 1928
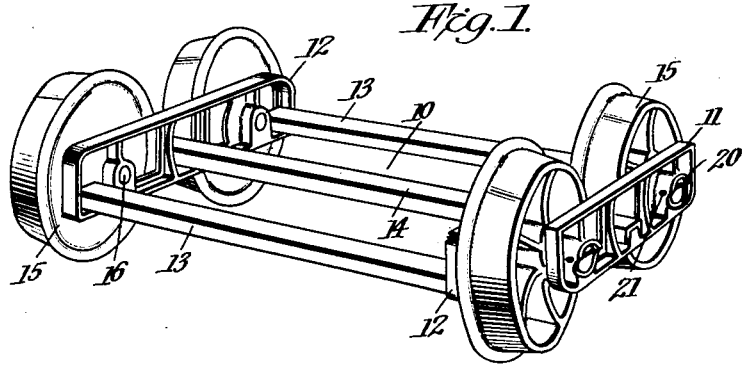
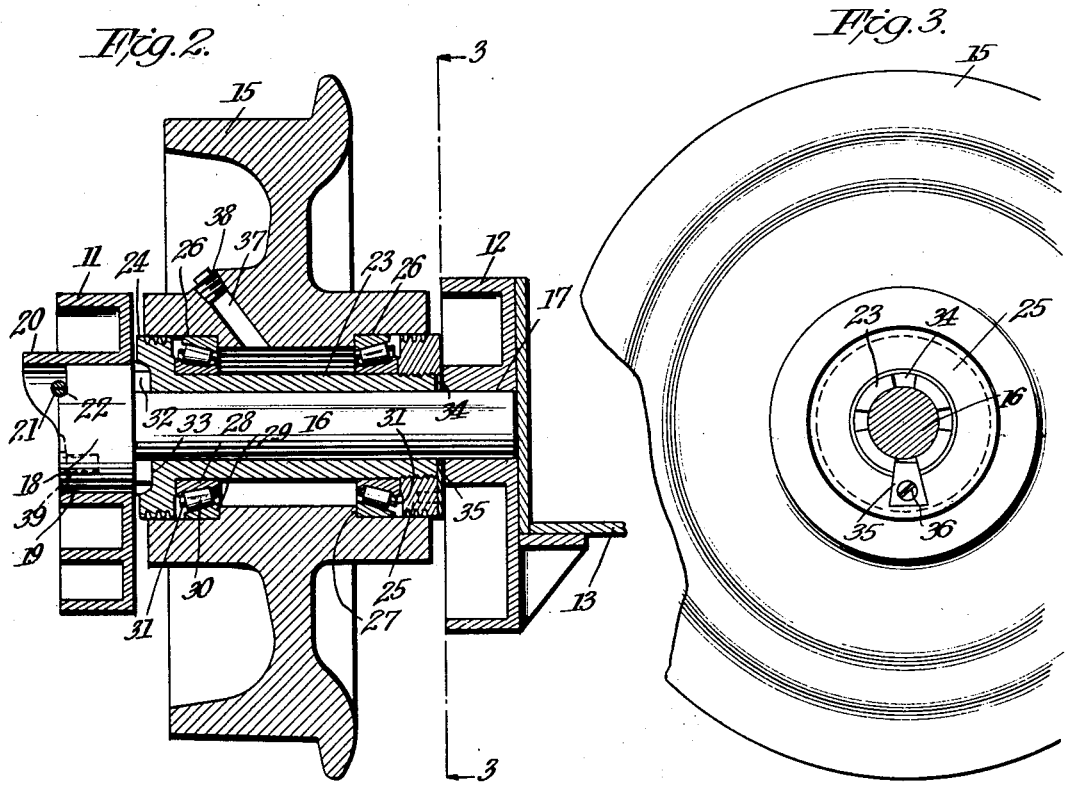
Inventor
Glenn E. Edmunds Patented Apr. 9, 1929.

1,708,608

UNITED STATES PATENT OFFICE.

GLENN E. EDMUNDS, OF COLUMBUS, OHIO, ASSIGNOR TO THE BONNEY-FLOYD COMPANY, OF COLUMBUS, OHIO, A CORPORATION OF OHIO.

WHEEL MOUNTING FOR MINE CARS.

Application filed February 4, 1928. Serial No. 251,947.

The present invention relates to cars of the stub axle type and more particularly to improvements in the axle construction and wheel mounting of a car for use in mines and industrial plants.

An essential object of the invention is to provide a wheel mounting and axle construction with means for maintaining the bearings in the wheel when the latter is removed from the axle.

Another object of the invention is to provide a wheel mounting which is simple, economical and durable in construction and in which the parts may readily be assembled or disassembled.

A further object consists in the provision of means for positively locking the axle and its associated parts to the truck frame, which means is conveniently positioned on the outside of the frames so as to be easily accessible for the purposes of allowing the removal of the axle and wheel from the frame.

Another object of the invention consists in the novel arrangement of a wheel mounting that is designed especially for tapered roller bearings used with outer and inner races.

Other objects and advantages of the invention will become apparent from the following description when taken in conjunction with the appended claims.

Referring to the drawings, in which is shown a preferred embodiment of the invention:

Figure 1 is a perspective view of a truck frame with the improved wheel mounting connected thereto.

Figure 2 is a vertical sectional view of the improved wheel mounting and axle construction.

Figure 3 is a view taken substantially along the line 3—3 of Figure 2, with parts broken away.

Referring to the drawings in which like numerals indicate like parts in the several views, 10 denotes a truck unit which is preferably composed of two pairs of side frames, or sill bars, each pair of which comprises the outer side frame members 11, and the spaced inner side frame members 12, that are connected by the end crossing girts 13, secured to the inner frames 12 and a central cross girt 14, which extends through the inner frames 12, and is suitably secured to the outer frames 11 between the wheels 15.

The improved wheel mounting, as more particularly shown in Figure 2, comprises a stub, or dummy axle 16, the inner end of which extends into an annular seat, or bearing 17 formed in the inner side frame 12, while the outer end of the axle preferably terminates in an enlarged portion 18, that fits into a complementary formed seat 19 in the outer side frame 11. Each of the outer frames 11, adjacent and above the seats 19, is preferably formed with an outwardly extending curved hood, or housing 20, provided with transversely aligned openings through which extend a cotter pin, or key 21, that fits into a notch 22 formed in the outer face of the enlarged portion 18 of the axle for detachably securing the wheel and axle in position.

The axle 16 between the frames 11 and 12 has mounted thereon an independent sleeve 23 preferably formed at its outer end with an enlarged integral collar 24, and has its opposite extremity threaded for the reception of a removable collar 25. The hub of the wheel 15 adjacent each of its ends preferably has a cut-out portion 26 that provides a shoulder 27 between which, and the adjacent collars 24, and 25, is positioned the bearings 28 and 29, that carry the rollers 30, said rollers being held in position by the ring members 31. Heretofore in removing a mine car wheel using tapered bearings off its axle, the outside bearing must be either removed first, or with the wheel. If the mechanic happens to be careless, this outside bearing generally drops out of the wheel hub upon the dirty floor or ground. In placing such a wheel equipped with tapered bearings on the axle, the inner bearings are first placed in position, then the wheel, and finally the outside bearing. After the adjusting nut and dusting collar have been screwed on, the wheel has to be greased or lubricated. By reason of the simple construction of the present invention, the danger of getting dirt or other foreign matter in the hub is effectively eliminated, due to the fact that the wheel mounting may be completely assembled in a dry, clean place, adjusted and greased before being connected to the truck frame.

The sleeve 23 may be prevented from rotating relative to the axle in any suitable manner, preferably by a key 32, that is secured to the axle and is arranged to fit in a complementary groove, or recess 33, in the collar 24. The inner face of the sleeve 23 (Figure 3) preferably has a series of diametrically arranged tapered recesses 34, which receive a locking member 35 that is detachably secured to the collar 25 by a screw 36, so as to maintain the collar in fixed position on the sleeve. The parts of the wheel mounting and axle construction may be supplied with lubricant through a port 37 in the wheel 15 that is closed by a plug 38.

The collars 24 and 25, are so associated with the adjacent ends of the wheel hub as to prevent the escape of lubricant, or the entry of dirt into the axle construction. The removable collar 25 additionally acts as an adjusting means for maintaining the roller bearings in proper position. The axle 16 is mounted in its seat in such a manner as to allow it to turn, or creep, so as to provide a uniform wear on the bearing surfaces, and also to maintain the lubricant in an active condition, thus insuring its proper circulation. The outer, or exposed face of the axle 16, has a threaded recess 39 arranged to receive an extracting tool for permitting the removal of the axle from the frame.

Assuming the parts to be in their locked operative position, as shown in Figure 2, and it is desired to remove the wheel, or axle from the frame, the same may be readily effected by withdrawing the cotter key 21 from the hood 20, and then inserting an extracting tool into the recess 18 and withdrawing the axle from the frame. It will be noted that when the axle 16 is removed from the wheel, the sleeve 23 retains the bearings in the wheel.

It is to be understood that the form of the invention shown and described, is merely illustrative and in no sense restrictive, and that such changes and modifications thereof, as fall within the purview of one skilled in the art may be made without departing from the spirit of the invention and the scope of the appended claims.

I claim:

1. In a mining car, a truck of the independent stub axle type comprising inner and outer spaced side frames having aligned seats, a stub axle mounted in said seats, a sleeve on said axle between said frames, a collar adjacent each end of the sleeve, bearings carried by the sleeve, and a wheel mounted on said bearings.

2. In a mining car, a truck of the independent stub axle type comprising inner and outer spaced side frames having aligned seats, a stub axle mounted in said seats, a sleeve on said axle between said frames, a collar adjacent each end of the sleeve, bearings carried by the sleeve between the collars, and means associated with the outer frame for detachably connecting the axle to the car.

3. In a mining car, a truck of the independent stub axle type comprising inner and outer spaced side sills having aligned seats, a stub axle mounted in said seats, a sleeve on said axle between said sills, anti-friction bearings carried by the sleeves, and a wheel mounted on said bearings.

4. In a mining car, a truck of the independent stub axle comprising inner and outer spaced side sills having aligned seats, a stub axle mounted in said seats, a sleeve on said axle between said sills, anti-friction bearings carried by the sleeves, a wheel mounted on said bearings, means for supplying lubricant to said bearings, and means on said sleeve adjacent said sills for preventing the escape of the lubricant, or the entry of dirt into the sleeve.

5. In a mining car, a truck of the independent stub axle type comprising inner and outer spaced side frames having aligned seats, a stub axle mounted in said seats, a sleeve on said axle between said frames, said sleeve having an integral collar at one end and a detachable collar connected to its opposite end, anti-friction bearings on said sleeve, and a wheel mounted on said bearings.

6. In a mining car, a truck of the independent stub axle type comprising inner and outer spaced side frames having aligned seats, a stub axle mounted in said seats, a sleeve on said axle between said frames, means preventing rotation of said sleeve relative to said axle, said sleeve having an integral collar at one end and a detachable collar connected to its opposite end, anti-friction bearings on said sleeve, and a wheel mounted on said bearings.

7. In a mining car, a truck of the independent stub axle type comprising inner and outer spaced side frames having aligned seats, a stub axle mounted in said seats, a sleeve on said axle between said frames, means preventing rotation of said sleeve relative to said axle, said sleeve having an integral collaar at one end and a detachable collar connected to its opposite end, anti-friction bearings on said sleeve, means for locking said detachable collar to said sleeve, and a wheel mounted on said bearings.

8. In a mining car, a truck of the independent stub axle type comprising inner and outer spaced side frames having aligned seats, a stub axle mounted in said seats, a sleeve on said axle between said frames, means preventing rotation of said sleeve relative to said axle, said sleeve having an integral collar at one end and a collar detachably connected to its opposite end, anti-friction bearings on said sleeve, a locking pin extending through the exposed face of the outer side frame and connected to said axle for detachably securing the axle to the frames, and a wheel mounted on said bearings.

9. In a mining car, a truck of the independent stub axle type comprising inner and outer spaced side frames having aligned seats, said outer frames formed with a laterally projecting hood, a stub axle mounted in said seats, a sleeve on said axle between said frames, said sleeve having an integral collar at one end and a removable collar connected to its opposite end, said collars arranged to prevent the escape of lubricant, or the entry of dirt into the sleeve, anti-friction bearings on said sleeve adjacent said collar, a wheel mounted on said bearings, and a locking pin extending transversely through said hood for detachably connecting the axle to the frame.

10. In a mining car, a truck of the independent stub axle type comprising inner and outer spaced side frames having seats formed therein, a stub axle mounted in said seats, a separate sleeve on said axle between said frames, means preventing rotation of said sleeve, said sleeve having an integral collar at its outer end, a removable collar connected to the inner end of the sleeve, anti-friction bearings on said sleeve adjacent said collars, a wheel mounted on said bearings, said removable collar regulating the adjustment of said bearings, and locking means on said sleeve engaging said removable collar for maintaining the latter in position.

11. In a mining car, a truck of the independent stub axle type comprising inner and outer spaced side frames having seats formed therein, a stub axle mounted in said seats, a separate sleeve on said axle between said frames, means preventing rotation of said sleeve, said sleeve having an integral collar at its outer end, a removable collar connected to the inner end of the sleeve, anti-friction bearings on said sleeve adjacent said collars, a wheel mounted on said bearings, said removable collar regulating the adjustment of said bearings, locking means on said sleeve engaging said removable collar for maintaining the latter in position, and means extending transversely through the exposed face of the outer side frame and engaging said axle for detachably securing the latter in position.

In testimony whereof I have hereunto set my hand.

GLENN E. EDMUNDS.